United States Patent
Fernald

(10) Patent No.: US 6,615,324 B1
(45) Date of Patent: Sep. 2, 2003

(54) EMBEDDED MICROPROCESSOR MULTI-LEVEL SECURITY SYSTEM IN FLASH MEMORY

(75) Inventor: Ken Fernald, Austin, TX (US)

(73) Assignee: Cygnal Integrated Products, Inc., Austin, TX (US)

( * ) Notice: Subject to any disclaimer, the term of this patent is extended or adjusted under 35 U.S.C. 154(b) by 0 days.

(21) Appl. No.: 09/479,551

(22) Filed: Jan. 7, 2000

(51) Int. Cl.[7] .............................................. G06F 12/14
(52) U.S. Cl. ........................ 711/153; 711/163; 711/152
(58) Field of Search ................................ 711/154, 163, 711/164, 152, 153, 173, 129

(56) References Cited

U.S. PATENT DOCUMENTS

| | | | |
|---|---|---|---|
| 3,573,855 A | * 4/1971 | Cragon et al. | ............... 711/163 |
| 3,742,458 A | * 6/1973 | Inoue et al. | ................ 711/154 |
| 4,975,878 A | 12/1990 | Boddu et al. | |
| 5,432,950 A | 7/1995 | Sibigtroth | |
| 5,452,431 A | 9/1995 | Bournas | |
| 5,600,818 A | 2/1997 | Weikmann | |
| 5,615,381 A | 3/1997 | Iijima | |
| 5,657,444 A | 8/1997 | Hall et al. | |
| 5,809,544 A | * 9/1998 | Dorsey et al. | ............... 711/163 |
| 5,844,843 A | 12/1998 | Matsubara et al. | |
| 5,848,435 A | * 12/1998 | Brant et al. | ................... 711/152 |
| 5,991,858 A | * 11/1999 | Weinlander | .................. 711/163 |
| 6,101,586 A | * 8/2000 | Ishimoto et al. | ............ 711/163 |

* cited by examiner

*Primary Examiner*—Matthew Kim
*Assistant Examiner*—Matthew D. Anderson
(74) *Attorney, Agent, or Firm*—Gregory M. Howison; Howison & Arnott, LLP

(57) ABSTRACT

An embedded microprocessor two level security system in flash memory. The memory includes an address input and a memory space of addressable locations having a restricted area and a user area. Addressing one of a the addressable locations therein results in the output of information therefrom in response to the receipt of an associated address on the address input. A logic device is provided for determining if a received address on the address input corresponds to an attempt to access an addressable location in the restricted space for output of information therefrom as the result of execution of a program instruction from the user area by an external processor. An inhibit device is provided for inhibiting access to the addressable location if a positive determination is made by the logic device

20 Claims, 4 Drawing Sheets

EMBEDDED MICROPROCESSOR MULTI-LEVEL SECURITY SYSTEM IN FLASH MEMORY

TECHNICAL FIELD OF THE INVENTION

This invention pertains in general to memory systems and, more particularly, to a data protected memory system.

BACKGROUND OF THE INVENTION

Currently available Memory systems are typically interfaced with a microprocessor core, which microprocessor core is operable to access any and all locations in the memory by generating an appropriate address. The processor requires access to the memory in order to both execute instructions and also read data from an address location or write data thereto.

In some situations, certain instructions are proprietary in nature and it is the desire of a manufacturer to protect that code. It is not the execution of the code that is to be protected but, rather, the ability of a user to gain access to the code, i.e., download the code, for reverse engineering thereof to determine the functionality that is embedded within the code. In systems that have provided this protected memory to prevent access to data or programs stored in the memory, circuitry is provided for monitoring the contents of the Program Counter and generating an inhibit signal whenever the Program Counter is at a certain value. This inhibit signal inhibits access to certain portions of the memory.

SUMMARY OF THE INVENTION

The invention disclosed and claimed herein comprises, in one aspect thereof, a protected memory. The protected memory includes an address input and a memory space of addressable locations having a restricted area and a user area. Addressing one of a the addressable locations therein results in the output of information therefrom in response to the receipt of an associated address on the address input. A logic device is provided for determining if a received address on the address input corresponds to an attempt to access an addressable location in the restricted space for output of information therefrom as the result of execution of a program instruction from the user area by an external processor. An inhibit device is provided for inhibiting access to the addressable location if a positive determination is made by the logic device.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
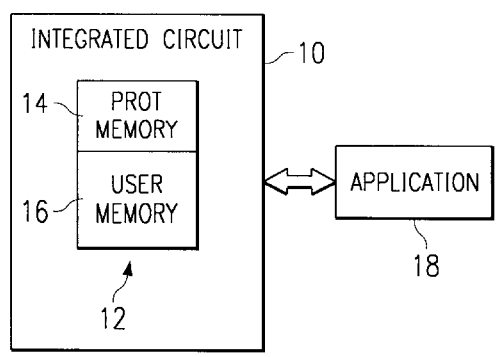
FIG. 1 illustrates a block diagram of the overall system associated with the present disclosed embodiment.

Referring now to FIG. 1, there is illustrated a top level diagram of a system utilizing the protected memory of the present disclosure. An integrated circuit 10 is provided which has disposed therein a protected memory 12. The protected memory 12 has associated therewith a protected memory region 14 and a user memory region 16. The integrated circuit 10 can be interfaced to any type of application 18 which can be any type of integrated circuit or board level device that interfaces with the integrated circuit 10. This integrated circuit 10 could be a part of a PC board which includes other integrated circuits or it could be a stand-alone integrated circuit that contains substantially all functionality needed to interface with the application 18. As will be described hereinbelow, the protected memory region 14 contains proprietary instructions that can be executed under the control of the user memory region 16. However, the user cannot, through program instructions stored in the user memory section 16, access information in the protected memory region 14 for retrieval therefrom for the purpose of viewing the instruction code or even the data stored in the protected memory region 14.

Figure 2:
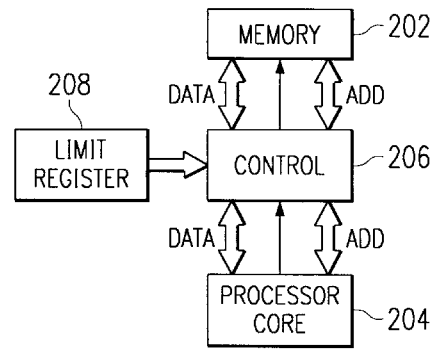
FIG. 2 illustrates a detailed diagram of the processor core and memory with the associated protected control logic.

Referring now to FIG. 2, there is illustrated a block diagram of the interface between a memory block 202 and a processor core 204. The processor core 204 contains general processing architecture and is operable to generate addresses, receive data, generate various control functions, etc. Typically, this will contain a Program Counter for substantially stepping through various instructions that are retrieved from the memory 202. A control logic block 206 is disposed between the processor core 204 and the memory 202, this having associated therewith the various logic function to achieve the protected memory function described hereinbelow. The control logic block 206 is operable to interpret addresses received from the processor core 204 and compare them with information stored in a limit register 208. This limit register 208 is either mask programmed or it is electronically programmed as a Write-Once, Read-Many (WORM) memory that allows a limit to be input to the integrated circuit 10, which limit defines the boundary between the protected memory region 14 and the user memory region 16. The control logic block 206, as will be described further hereinbelow, is operable to monitor the contents of the address bus and determine whether the contents of the address bus are directed toward the operation of fetching data or attempting to fetch an instruction code, i.e., whether the contents of the address bus constitute the contents of the Program Counter. With this information, the control logic block can then determine whether access is to be allowed to the memory 202. If not, some type of inhibit or other protected operation is undertaken.

Figure 3:
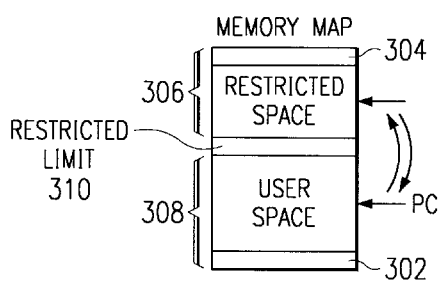
FIG. 3 illustrates a diagrammatic view of the memory map for the restricted space and user space.

Referring now to FIG. 3, there is illustrated a diagrammatic view of a memory map for the memory 202. The memory 202, as is conventional, is comprised of a plurality of memory locations which are accessible by generating an address. When the address is generated, a plurality of memory locations are accessed which typically constitute a "byte" of data, although any length is anticipated. For each address generated, one byte of data will be output. The memory map of FIG. 3 represents a sequence of byte locations from a lower byte location 302 to an upper byte location 304. The memory is divided into a restricted space and a user space, the restricted space comprising memory locations 306 and the user space comprising memory locations 308. There is one addressable memory location, memory location 310, which constitutes the boundary memory location. The address of this boundary location constitutes an address that is in the restricted space 306 and which address comprises the "limit" for the operation, as will be described in more detail hereinbelow.

The Program Counter (PC) is basically a pointer that defines an address for a particular instruction to be carried out. When this Program Counter address is generated, it is placed onto the address bus and the information at that address location extracted therefrom and routed to the processor core 204 for operations thereon. In the execution of the various instructions, the Program Counter may actually jump from the user space 308 up the restricted space 306 to execute instructions therein. This is allowed in accordance with the embodiment herein to facilitate executing instructions in the restricted space 306 in response to a "call" instruction executed in the user space 308. However, as will be further described hereinbelow, instructions in the user space 308 cannot generate an address for the purpose of reading data from the restricted space 306 which would allow output of information stored in the restricted space from the system. The protective operation described herein is operable to prevent such an operation from occurring.

Figure 4:
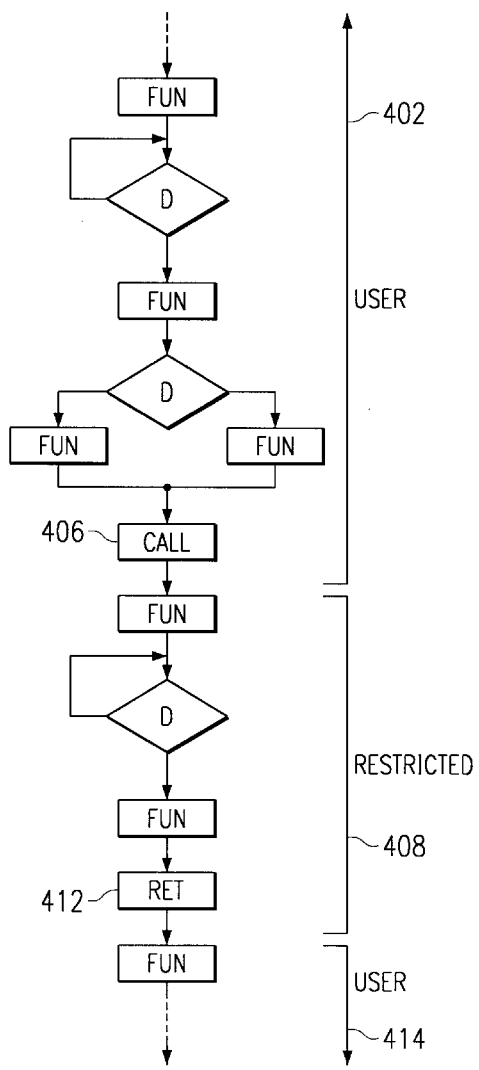
FIG. 4 illustrates an exemplary flowchart illustrating a processor between the user space and the restricted space.

Referring now to FIG. 4, there is illustrated an exemplary flowchart that depicts operation of the system wherein the instructions jump between the user space and the restricted space. In the first portion 402, the flowchart is executed along a flow path which has inserted therein a "Call" instruction in a block 406. At this instruction, the program is instructed to jump to the restricted space 306 by changing the value of the Program Counter (PC) and execute instructions therein in accordance with the new value of the PC. These blocks in the flowchart are a combination of various function blocks "Fun" and decision blocks "D." When the Call instruction is incurred at the block 406, the program will jump to the restricted space, represented by region 408. Of course, the Call instruction 406 must have associated therewith an Operand that has a Program Counter value associated with an addressable location within the restricted space 306. Once in the restricted space at the jumped-to location, the program will begin execution therefrom. This is represented by the various operational blocks in the program within the region 408. Once all the instructions have been executed in the restricted space associated with the jumped-to location, there will be an instruction at the end of the executable portion representing a return to the user space, indicated by a function block 412. This will then result in the Program Counter being returned back to the user space, typically at the next sequential Program Counter value as that associated with the Call instruction 406. The program will then continue in the user space, as represented by a portion 414 of the flowchart.

By executing instructions in the user portion 402 or the user portion 414 of the flowchart, the protective circuitry, as will be described hereinbelow, prohibits any instructions from accessing an addressable location within the restricted space 306 for reading of information therein or writing of information thereto. This is facilitated by examining the contents of the address bus and determining whether the contents of the address bus constitute an address for the purpose of reading or writing data or they constitute a Program Counter value for the purpose of executing an instruction. If the program is operating in the user space and the information placed on the address bus is that of an address, as opposed to a Program Counter value, then the system is restricted. However, once the program is jumped over to the restricted space 408 through the incrementing of the Program Counter to an addressable location within the restricted space and placing of that Program Counter value on the address bus, then the operation will be transferred to the restricted space. Once in the restricted space, the program in the restricted space is capable of reading information from an addressable location anywhere in the memory and writing information thereto. This, of course, will be under the control of proprietary software and not under the control of user-generated software in the user space 308.

Figure 5:
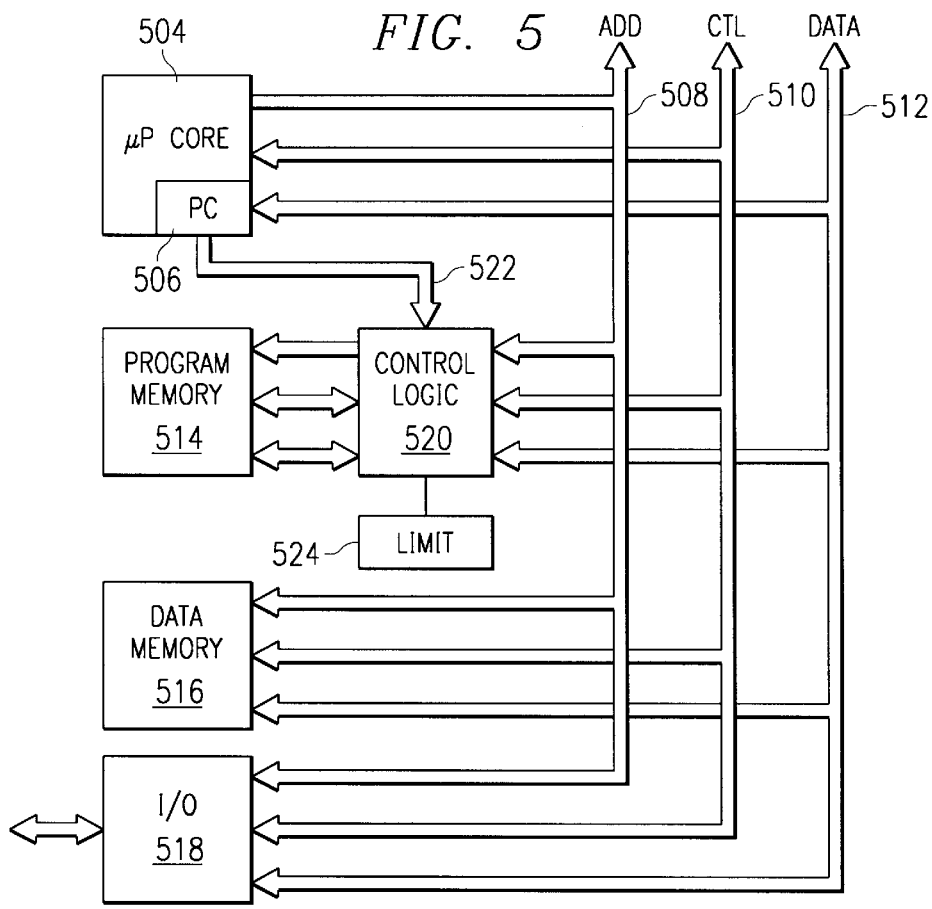
FIG. 5 illustrates a diagrammatic view of a system using the protected memory of the present disclosure.

Referring now to FIG. 5, there is illustrated a block diagram of an integrated circuit 10 incorporating the protected memory. A microprocessor core 504 is provided having a Program Counter 506 associated therewith. The microprocessor core 504 is interfaced with an address bus 508, a control bus 510 and a data bus 512. There is also provided a program memory 514, the protected memory in the system, and a data memory 516. The data memory 516 can be any type of memory, a volatile memory or a non-volatile memory, for storing readily accessible data in the such. There is also provided an input/output interface block 518 which is operable to interface external circuitry with the buses 508–512. The program memory 514 and the data memory 516 are also interfaced with the buses 508–512. However, the memory 514, the protected memory, is interfaced with the buses 508–512 through a control logic block 520. This control logic block 520 is operable to examine both the address information on the address bus 508 and also the information in the Program Counter (or information relating thereto), which is interfaced therewith, through a Program Counter bus 522. Of course, it should be understood that some of this control logic 520 could be incorporated into the microprocessor core 504 and merely the results of a comparison operation provided as a limited value output. The control logic block 520 is interfaced with a limit register 524, which is similar to the limit register 208 in that it contains information regarding the addressable location of the output between the restricted space 306 and the user space 308, this essentially being the address of the limit location 310. However, it should be understood that multiple limits could be provided within the restricted space providing different restricted spaces. It is merely noted that the control logic block 520 is operable to monitor the operation of the system and determine whether access to the memory 514 is to be allowed when this address is generated. This is based upon various considerations, as will be discussed hereinbelow.

The control logic block 520 is operable, when a determination is made that access is to be prohibited, to take one of a number of actions. One action could be to actually inhibit the address from being routed to the memory 14; one action could be to alter the address such that the desired location is not actually addressed, but the address is forced to the unrestricted space. Another action could be to inhibit output of data during that time or to output a preset data value such as an eight bit value of $00_h$. A further action is to inhibit the control circuitry feeding the memory. Each of these different alternatives will be described hereinbelow. However, it should be understood that any manner of preventing access to information within the memory, once it has been determined that access to the restricted space is to be denied, would be anticipated by the present disclosure.

In order to describe how the system operates with respect to the Program Counter and the contents of the address register which can selectively be placed on the address bus, reference is made to the following Table 1.

TABLE 1

|  | MEM | PC | BUS | BUS CONTENT |
|---|---|---|---|---|
| (OPCODE) | MOVEC | $0001_h$ | $0001_h$ | PC Value |
| (OPERAND) | $CD_h$ | $0002_h$ | $0002_h$ | PC Value |
| (DATA) | $FC_h$ | xxxx | $00CD_h$ | ADDR-Allowed |
| . | . | . | . | . |
| . | . | . | . | . |
| (OPCODE) | LJMP | $00F1_h$ | $00F1_h$ | PC Value |
| (OPERAND) | $FE_h$ | $00F2_h$ | $00F2_h$ | PC Value |
| (OPERAND) | $FE_h$ | $00F3_h$ | $00F3_h$ | PC Value |
| (OPCODE) | PUSH | $FEFE_h$ | $FEFE_h$ | PC Value |
| . | . | . | . | . |
| . | . | . | . | . |
| (OPCODE) | MOVEC | $FEFE_h$ | $FEFE_h$ | PC Value |
| (OPERAND) | $FF_h$ | $FEFF_h$ | $FEFF_h$ | PC Value |
| (OPERAND) | $FF_h$ | $FF00_h$ | $FF00_h$ | PC Value |
| (DATA) | $C2_h$ | xxxx | $FFFF_h$ | ADDR-Allowed |
| . | . | . | . | . |
| . | . | . | . | . |
| (OPCODE) | MOVEC | $00FE_h$ | $00FE_h$ | PC Value |
| (OPERAND) | $FF_h$ | $FEFF_h$ | $COFF_h$ | PC Value |
| (OPERAND) | $FF_h$ | $C000_h$ | $C000_h$ | PC Value |
| (DATA) | $C2_h$ | xxxx | $FFFF_h$ | ADDR-Not Allowed |

In Table 1, it can be seen that there is provided the content of the memory location being addressed, the value of the Program Counter, the value actually placed on the address bus and the contents of the address bus. In the first line, the Program Counter is initiated at a value of $0001_h$ representing the first instructions which are initiated at the first location in the memory. By example, this is a move command which is operable to control information to the access from the memory and move to a register, such an accumulator or another location. This is referred to as the command "MOVEC." This constitutes the Opcode. The second part of the instruction will be the Operand, which, in this instance, will be output when the Program Counter changes to $0002_h$. This results in the eight-bit value $CD_h$ being output on the address bus in the next operation. Therefore, for the first two steps, it can be seen that the Program Counter value can be placed onto the address bus for the purpose of addressing the memory. The eight-bit Operand $CD_h$ constitutes an operation wherein this eight-bit value is appended onto another value, in this example, an eight-bit value of $00_h$ to result in the overall address value of $00CD_h$. At this point in time, the address bus value is an address value that is output from an address register and, therefore, the contents of the Program Counter are a "don't care." As the instructions continue, the Program Counter will be incremented up to or jumped to a value of $00F1_h$. The Opcode in the memory will be a long jump command, LJMP, which requires both the high and low address values to the output over the next two increments of the Program Counter. The first address will be a PC counter value of $00F2_h$ at the value of $FE_h$, and the next Program Counter increment of $00F3_h$ will result in an Operand of $FE_h$ being output. These two Operands are assembled as the high and low portions of the memory address and placed into the Program Register as an address $FEFE_h$. This constitutes a new Program Counter value which is then the subject of some command in the memory, a PUSH command in this example, although it could be any type of command, the result of the overall LJMP operation being to increment the Program Counter the value $FEFE_h$ to execute this command.

To illustrate the operation wherein a data move command is allowed within the restricted space, a third section of the code is illustrated. This is initiated at a program counter value of $FEFE_h$ as a MOVEC command. This is operable to, on the next two increments of the program counter to $FEFF_h$ and $FF00_h$, respectively, to output the two operands $FF_h$ and $FF_h$. This results in an address value of $FFFF_h$ being placed onto the address bus to extract data from that location in the restricted space, wherein the boundary between the restricted space and the user space is the address $F000_h$. The system will examine the fact that the PC value on the previous operand was within the restricted space, but that it was an allowed operation, since the instruction originated within the restricted space due to the fact that the program counter exists in the restricted space.

In a fourth section of the code, originating with a MOVEC command at an address of $00FE_h$ Program Counter value, an address attempt is made to the address location $FFFF_h$. If the limit between the restricted and user space is an address location of $F000_h$, then this would indicate that a command originating in the user location $00FE_h$ was trying to attempt to place an address on the address bus that was in the restricted area, i.e., attempting to extract data therefrom. It can be seen by comparison of the last two sections of the code, that an instruction originating in the restricted space accessing information in the restricted space (or even in the user space) is allowed, wherein access to information in the restricted space in response to an instruction from the user space is not allowed.

In the operation described in Table 1, a decision would be made at the point that the commands in the memory would result in an address being placed onto the address bus. It is at this point in time that the system examines the location within the memory of the Program Counter, and then also looks at the address to determine whether the address is seeking to address information within the user space or the restricted space. As described hereinabove and as will be further described hereinbelow in more detail, if the Program Counter is in user space, addressing information in restricted space for the purpose of outputting this information or examining the contents thereof will be prohibited. Alternatively, if the Program Counter is within the restricted space, i.e., executing instructions of a proprietary nature to the chip vendor, then addressing within the restricted space or the user space will be permitted.

Figure 6:
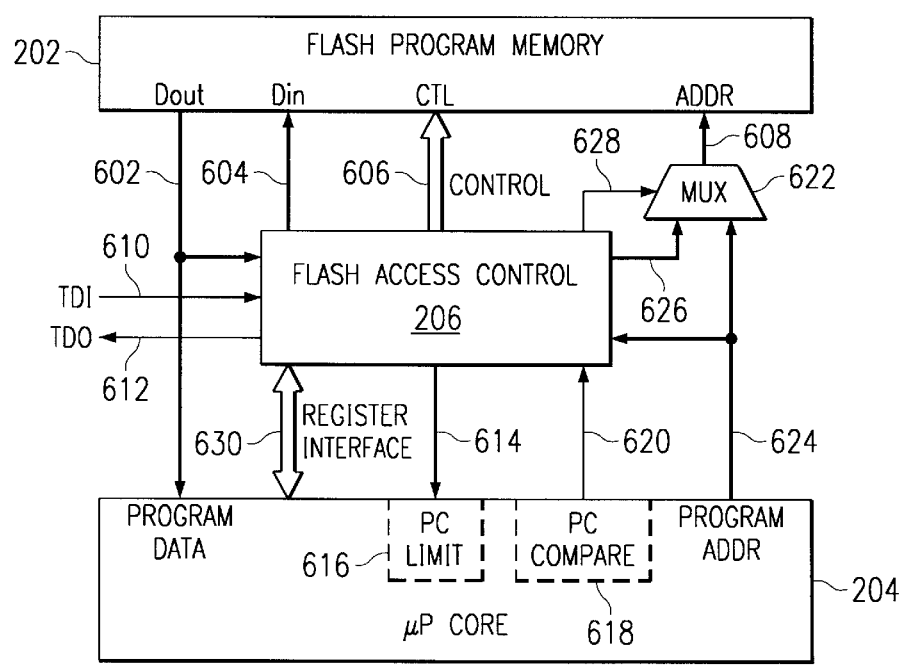
FIG. 6 illustrates a more detailed block diagram of a microprocessor core and memory with the protective logic interface.

Referring now to FIG. 6, there is illustrated a more detailed block diagram of the embodiment of FIG. 2, wherein like numerals refer to like parts in the various figures. The memory 202 is realized with a flash memory, which has a data output port, Dout, interfaced with data output bus 602 and a data input port, Din, interfaced with a data input bus 604. There is also provided a control input CTL, which receives controls from a control bus 606. The address is received on an address input via an address bus 608. The control device 206 is comprised of a flash access control which is operable to interface with a TDI input bus 610, a serial bus, and provide data output on a TDO serial output bus 612. The control 206 also is interfaced with the data bus 602 such that the output by the memory 202 can be received thereby.

The control device 206 is operable to store the limit information and provide that on a bus 614 to the microprocessor core 204 as the Program Counter limit, represented by a phantom block 616. Internal to the microprocessor core 204, in one embodiment, the comparison operation compares the actual value of the Program Counter with the PC limit in phantom block 616. This is output by an phantom block 618 which is labeled "PC Compare." This is output as a signal on a signal line 620 to the control block 206.

The control block 206 is operable to interface with, and include as part thereof, an address modifying the circuit, which is comprised in this example of multiplexer 622. The multiplexer 622 is operable to receive a portion of the address on an address bus 624, which address is also input to the control block 206, this operation described in more detail hereinbelow. This portion of the address can be modified and output to the multiplexer on a bus 626. The multiplexer 622 is controlled by a control line 628 such that the multiplexer can output the full address on bus 624 or a modified address on a bus 626. This modified address basically is operable to inhibit address input to the memory 202 when it is determined that this address is the result of a program instruction that is attempting to download or move data from the restricted portion of the memory space when the instruction code is derived from the user portion of the memory space. During operation of the memory 202, when program instructions are extracted from the memory 202 in response to a Program Counter value as an address being placed on the address bus 624, then program data will be output on the output bus 602 into a program data input on microprocessor 204 via the data bus 602. Further, there is provided a register interface 630 between the control block 206 and the microprocessor core 204. This is a flash access control function provided by the control block 206 and is generally a conventional access to a flash memory. Serial data can be input to the flash memory via the input bus 610 and data read therefrom for the purpose of programming the memory initially and for programming instruction registers in the control block 206, this being a configuration operation—a conventional operation.

Figure 7:
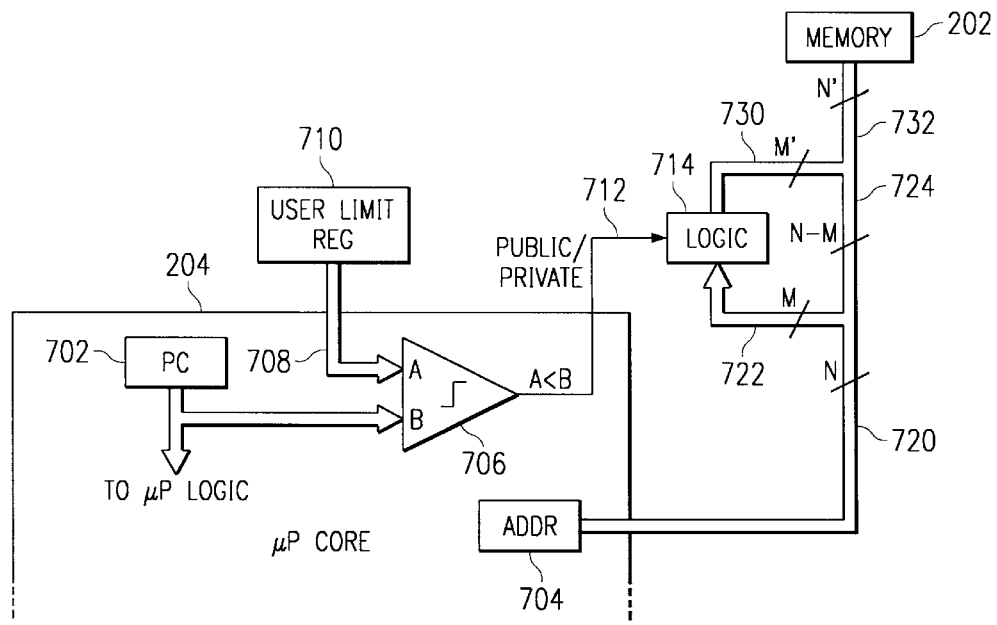
FIG. 7 illustrates a detailed block diagram of one aspect of the protective logic.

Referring now to FIG. 7, there is illustrated a detailed block diagram of one embodiment for restricting access. The microprocessor core 204 has contained therein, in a simplified illustration, a Program Counter 702 and an address register 704. The Program Counter 702 is operable to output a count value for programming instructions that will be provided it to the microprocessor logic and also provided to a comparator 706. The comparator 706 is also operable to interface through a bus 708 to a user limit register 710, this typically in the control block 206. However, this could be a limit that could be hard wired into the microprocessor core 204 or in a completely separate register in the core 204. This could even be a register within the flash memory 202 that is accessible by a certain sequence of program instructions. In any event, once loaded, this limit is unalterable by the user and, in some situations, by the actual vendor themselves.

The comparator 706 is operable to compare the value of the Program Counter with the value in the user limit register. In this manner, the comparator will provide an output on a signal line 712 which will indicate whether the Program Counter is in the restricted or in the user space with a public/private signal. This signal line 712 is input to logic block 714.

The address register 704 in the microprocessor 204 is output on an address bus 720, which has a width of N. This bus has a portion of the bits thereof extracted therefrom, there being M bits extracted therefrom on a bus 722. Therefore, the bus 720 is divided into a bus 722 with M bus lines and a bus 724 with N-M bus lines. The bus 722 is input to a logic block 714, this typically representing the upper block of memory. If there is no inhibit operation on the memory 202 to be performed due to an attempt to access data in the restricted space while operating the program in the user space, then the logic 714 will pass the received bits on the bus 722 out onto a bus 730 to be combined with the bus 724 on a bus 732. The bus 730 provides the bits M' wherein the bus 732 provides bits N'. This represents a situation wherein the bus may actually be modified by having the upper block altered. Typically, the upper block of memory addressing bits, the M bits, will be altered in the event of a positive decision on the signal line 712 that the Program Counter 702 is operating in the public area and the address output thereof is from the address register 704 and is addressing information in the private area. It should be understood that this example illustrates an address from the address register 704 where, in program situations, the information on the address bus 720 is from the Program Counter 702. This is not illustrated for simplicity purposes. However, the conduct of the address bus 720 is typically selected by a multiplexer (not shown) that selects either the output of the address register 704 or the output Program Counter 702.

Figure 8:
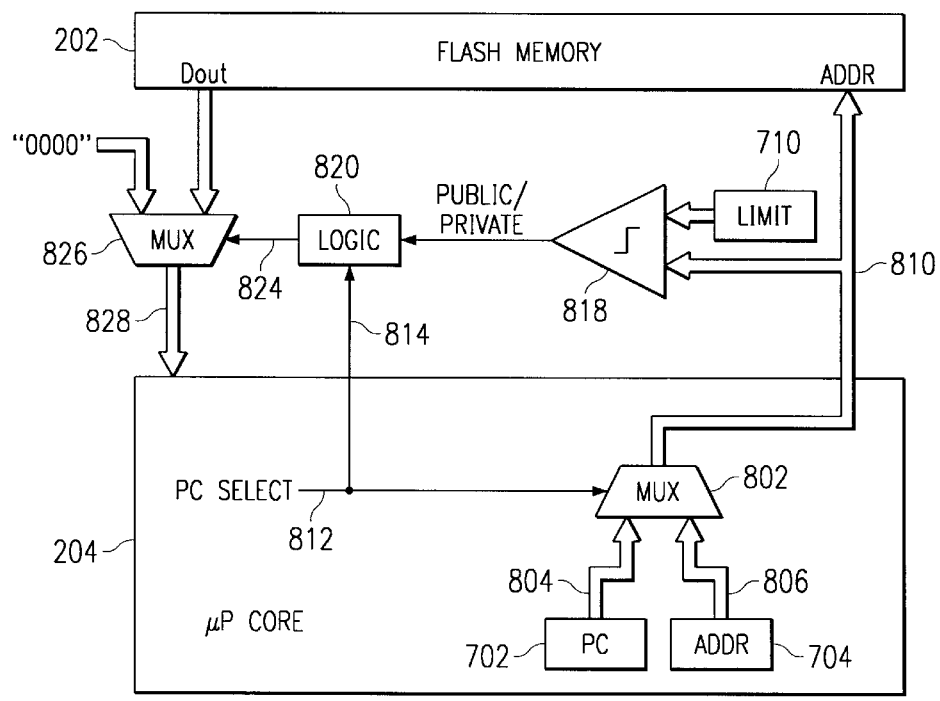
FIG. 8 illustrates a block diagram of another embodiment of the protective logic.

Referring now to FIG. 8, there is illustrated a block diagram of an alternate embodiment for inhibiting access to the memory 202 whenever an instruction executed in the user space attempts to access data in the restricted space, it being understood that a jump to a program instruction in the restricted space is allowed from the user space. In the microprocessor core 204, there is provided a multiplexer 802 that is operable to interface between the address register 704 and the Program Counter 702. The Program Counter 702 provides an output therefrom on a bus 804 to one input of the multiplexer 802, whereas the output of the address register is input to the other input of the multiplexer 802 through a second bus 806. The output of the multiplexer comprises an address bus output that is connected to an address bus 810 that is connected to the address input of the memory 202. The multiplexer 802 receives a PC select signal on an internal line 812 within the microprocessor core 204. This also is a conventional output provided by the microprocessor core 204 on a signal line 814. This line 814 indicates whether the PC register 702 is selected or the address register 704 is selected.

The contents of the address bus 810 are compared with that of the user limit register 710 with a comparator 818. This comparator 818 determines whether the address is in the public or private region of the address space, i.e., the user or restricted space, respectively. The output of this comparison operation is input to a logic block 820 which also receives the signal on the signal line 814. This logic block 820 provides an output indicating a positive decision whenever it is determined that the contents of the PC register 702 are not output on the bus 810, i.e., the contents of the address register 704 output on the address bus 810 and that the address is above the limit in the limit register 710. This positive result indicates an unauthorized attempt to access the memory 202 in the restricted space. A signal is output on a line 824 to a multiplexer 826, which multiplexer 826 will select either the data output of the memory 202 or a value of $0000_h$, a "null" value. For a positive result, the null value is selected for input to the memory 204 on the program data input via a bus 828. Logic block 820, in the alternate operational mode in the restricted space, can determine that the Program Counter value is selected for output on the bus 810 and that the Program Counter value is in the restricted address space. This indicates a program instruction that is generated by the program in the restricted space. This is latched by the logic block 820, since the comparator 818 will indicate this as being in the private region. Therefore, an indication on the line 814 that the Program Counter 702 is selected by the multiplexer 802 and that the information on the address bus 810 is in the private or restricted space is latched such that, if a subsequent instruction indicates that the contents of the address register 704 are selected, i.e., the signal line 814 indicates that the address register is selected, and that the address is attempting to address information in the memory 202, this will be allowed due to the fact that the previous program instruction was generated by program instructions in the restricted space.

A Verilog output is provided representing the operation wherein access to data in the memory with an address that is greater than the read limit resulting from the program instruction executed in the reader space:

```
wire    addr_gt_readlimit = (mem_addr > {4'h7, read-limit, 4'hf});
always @ (posedge clk or posedge rst)
    if (rst)
        user_code_executing <= 0;
    else if (pc_valid)
        user_code_executing <=    ~addr_gt_readlimit;
assign read_limit_exceeded =     ~core-reset & ~suspend       // uP access that is
                                 ~mem_psenb &                 // a read cycle, by
                                 user_code_executing &        // user code that is not
                                 ~pc_valid &                  // an instruction fetch
                                 addr_gt_readlimit;
          *--------------------------------mem_rdata Mux-------------------------------*/
//
//    if either a S/W read access exceeds the "read_limit" or the JTAG port
//    trys to read a "read_locked" region - the security H/W will mux ZEROs
//    onto the "security_dout" bus
//
assign security_dout = read_limit_exceeded
                                 ?8'h00             // output all zeros
                                 :dout;             // read data from flash
```

Figure 9:
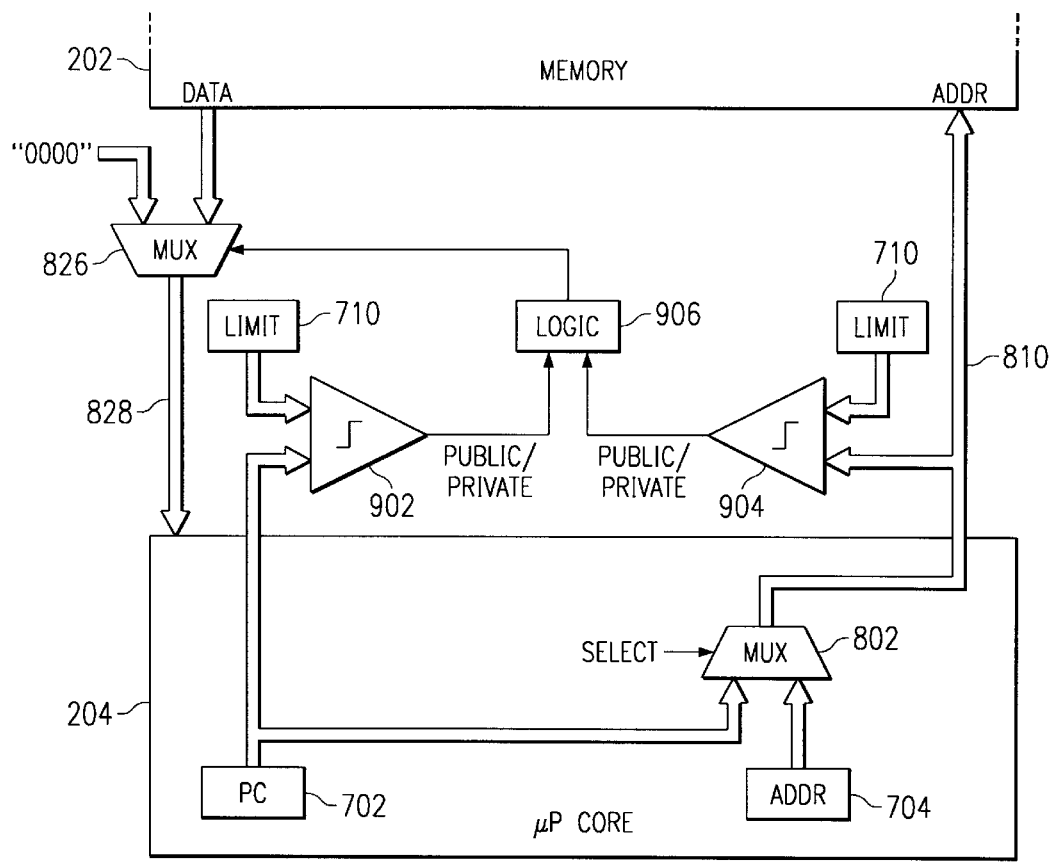
FIG. 9 illustrates another embodiment of the protective logic.

Referring now to FIG. 9, there is illustrated a block diagram of an alternate embodiment. In the embodiment of FIG. 9, the contents of the Program Counter 702 are output to a comparator 902 which compares the information thereof with the contents of the limit register 710 to determine if the Program Counter value is in a public or private region. Similarly, the contents of the address bus 810 are compared with a comparator 904 with a limit in the limit register 710. The limit register 710 is illustrated as two registers for simplicity purposes, to determine if the contents of the address register are in the public or private region. The output of both comparators 902 and 904 are input to the logic block 906. Logic block 906 determines whether the Program Counter is in the private or public area and also determines whether the information in the address bus 810 is in the public or private area. If it is determined that the Program Counter 702 is operating in the private area and that the information in the address bus 810 is operating in the private area, then the multiplexer will allow data to flow therethrough, since the logic block 906 can determine that the address is the result of a previous Program Counter instruction in the private area or restricted area. However, when it is determined that the Program Counter is in the public area, the user area, and the address is an address value from address register 704 and this is in the restricted or private area, then the logic block 906 will control the multiplexer to select the null value.

Figure 10:
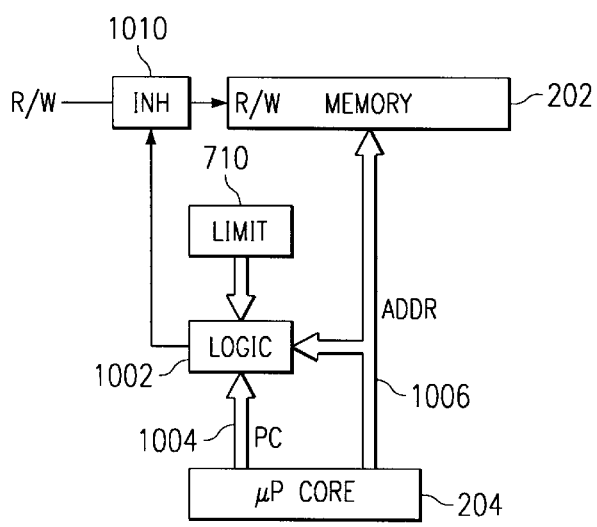
FIG. 10 illustrates an additional embodiment of the protective logic.

Referring now to FIG. 10, there is illustrated a view of an alternate embodiment for inhibiting the memory operation. In this simplified embodiment, there is provided a control block or logic block 1002 that is operable to receive the output of the Program Counter on a bus 1004 and the address bus on an address bus 1006. The logic block 1002 compares this with information in the limit register 710 to determine what type of operation is being performed, i.e., a program instruction or a memory access instruction, and where in the memory map the address resides. This was described hereinabove. In this embodiment, there is provided an inhibit circuit 1010 that is operable to inhibit a read/write operation to memory 202 in the event that the logic block 1002 makes a determination that this is a restricted operation.

Although the preferred embodiment has been described in detail, it should be understood that various changes, substitutions and alterations can be made therein without departing from the spirit and scope of the invention as defined by the appended claims.

What is claimed is:

1. A protected memory, comprising:
   an address input for receiving an address;
   a memory space of addressable memory locations, each having an associated address and each for storage of information therein as stored information, said memory space having a restricted area and a user area, wherein addressing of one of said addressable locations therein results in the output of stored information therefrom in response to the receipt of an associated address on said address input, at least one of said addressable memory locations in said user area having an executable instruction stored therein;
   a logic device for determining if a received address on said address input corresponds to an attempt to access an addressable location in the restricted area for output of information therefrom as the result of execution of a program instruction from said user area by an external processor; and
   an inhibit device for inhibiting access to information stored in said addressable locations if a positive determination is made by said logic device that the execution of a program instruction from said user area will result in access of information in said restricted area for the purpose of outputting of the contents of said addressable locations in said restricted area, but launching of an executable instruction in said restricted area from an executable instruction in said user area is allowed.

2. The memory of claim 1 wherein said logic device includes:

an address monitor for monitoring said address input and determining the address value thereon;

a first comparator for comparing the determined address value from said address monitor with pre-determined criteria and providing an output indicating whether said address is associated with an addressable location in said restricted area or in said user area;

a program instruction determination device for determining if said address value determined by said address monitor corresponds to a programming operation that was executed by the external processor in response to a program instruction stored in said user area; and a second comparator for generating an output when said first comparator determines that said determined address value originates in said restricted area and said program instruction determination device determines that said program instruction is attempting to access stored information.

3. The memory of claim 1 wherein said restricted area is a contiguous area and said user area is a contiguous area such a boundary therebetween comprises a limit value of a predetermined addressable location and wherein said logic device includes a comparator for comparing the address on said address input to said limit value to determine whether said address is associated with an addressable location in said restricted area or said user area.

4. The protected memory of claim 1, wherein the external processor has a program counter for pointing to an addressable location associated with the program instruction being carried out and wherein the inhibit device is operable to inhibit access to information stored in said addressable locations if it is determined by said logic device that said received address is different than the value of said programmable counter when the value of said programmable counter is associated with an addressable location within said user area.

5. The protected memory of claim 1, wherein said inhibit device is operable to inhibit access to the addressed one of said addressable locations by preventing addressing thereof.

6. The protected memory of claim 1, wherein said inhibit device is operable to inhibit output of information stored at the addressed one of said addressable locations when a positive determination is made by said logic device.

7. The protected memory of claim 1, wherein said inhibit device is operable to alter the value output from said memory space at the addressed one of said addressable locations if a positive determination is made by said logic device.

8. The protected memory of claim 7, wherein said inhibit device is operable to output a default value as the altered value.

9. The protected memory of claim 1, and further comprising a limit register for storing a predetermined limit address that defines the boundary between said user space and said restricted space.

10. The protected memory of claim 9, and further comprising means for altering the information stored in said limit register.

11. A method for protecting a memory, comprising the steps of:

inputting an address on an address input;

providing a memory space of addressable locations, each having an associated address and each for storage of information therein as stored information, the memory space having a restricted area and a user area, wherein addressing of one of the addressable locations therein results in the output of stored information therefrom in response to the receipt of an associated address on the address input, at least one of the addressable locations in the restricted area having an executable instruction stored therein;

determining with a logic device if a received address on the address input corresponds to an attempt to access an addressable location in the restricted area for output of information therefrom as the result of execution of a program instruction from the user area by an external processor; and inhibiting with an inhibit device access to information stored in the addressable locations if a positive determination is made by the step of determining and the received address is not the address associated with the at least one of the addressable locations in the restricted area.

12. The method of claim 11 wherein the step of determining includes the steps of:

monitoring with an address monitor the address input and determining the address value thereon;

comparing with a first comparator the determined address value from the step of monitoring with pre-determined criteria and providing an output indicating whether the address is associated with an addressable location in the restricted area or in the user area;

determining with a program instruction determination device if the address value determined by the address monitor corresponds to a programming operation that was executed by the external processor in response to a program instruction stored in the user area; and generating with a second comparator an output when the step of comparing determines that the determined address value originates in the restricted area and the step of determining determines that the program instruction is attempting to access stored information.

13. The method of claim 11 wherein the restricted area is a contiguous area and the user area is a contiguous area such that the boundary therebetween comprises a limit value of a predetermined addressable location and wherein the step of determining with a logic device includes the step of comparing the address on the address input to the limit value to determine whether the address is associated with an addressable location in the restricted area or the user area.

14. The method of claim 11, wherein the external processor has a program counter for pointing to an addressable location associated with the program instruction being carried out and wherein the step of inhibiting is operable to inhibit access to information stored in the addressable locations if it is determined by the step of determining with a logic device that the received address is different than the value of the programmable counter when the value of the programmable counter is associated with an addressable location within the user area.

15. The method of claim 11, wherein the step of inhibiting is operable to inhibit access to the addressed one of the addressable locations by preventing addressing thereof.

16. The method of claim 11, wherein the step of inhibiting is operable to inhibit output of information stored at the addressed one of the addressable locations when a positive determination is made by the logic device.

17. The method of claim 11, wherein the step of inhibiting is operable to alter the value output from the memory space at the addressed one of the addressable locations if a positive determination is made by the step of determining with a logic device.

18. The method of claim 17, wherein the step of inhibiting is operable to output a default value as the altered value.

19. The method of claim 11, and further comprising the steps of storing in a limit register a predetermined limit address that defines the boundary between the user space and the restricted space.

20. The method of claim 19, and further comprising the step of altering the information stored in the limit register.

* * * * *